United States Patent
Bacchus et al.

(10) Patent No.: US 12,266,187 B2
(45) Date of Patent: Apr. 1, 2025

(54) VISUAL WIRELESS BASED POSITIONING EXPLOITING MULTIPATH FOR OUTDOOR POSITIONING

(71) Applicant: GM Global Technology Operations LLC, Detroit, MI (US)

(72) Inventors: Brent Navin Roger Bacchus, Sterling Heights, MI (US); Rakesh Kumar, Mississauga (CA); Bo Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 407 days.

(21) Appl. No.: 17/587,699

(22) Filed: Jan. 28, 2022

(65) Prior Publication Data
US 2023/0245464 A1 Aug. 3, 2023

(51) Int. Cl.
| | | |
|---|---|---|
| *G06K 9/00* | (2022.01) | |
| *B60W 40/105* | (2012.01) | |
| *G06V 20/58* | (2022.01) | |
| *H04W 88/10* | (2009.01) | |

(52) U.S. Cl.
CPC ........... *G06V 20/58* (2022.01); *B60W 40/105* (2013.01); *H04W 88/10* (2013.01); *B60W 2420/403* (2013.01); *B60W 2420/408* (2024.01); *B60W 2554/4041* (2020.02); *B60W 2554/4049* (2020.02)

(58) Field of Classification Search
CPC .................. G06V 20/58; G06V 20/56; B60W 2554/4041
See application file for complete search history.

(56) References Cited

U.S. PATENT DOCUMENTS

| 12,190,607 | B2 | 1/2025 | Yousif | |
|---|---|---|---|---|
| 2015/0094089 | A1* | 4/2015 | Moeglein | H04W 4/33 455/456.1 |
| 2016/0005229 | A1* | 1/2016 | Lee | G06T 11/60 345/419 |

(Continued)

FOREIGN PATENT DOCUMENTS

| CN | 104781686 A | * | 7/2015 | ........... G01C 21/206 |
|---|---|---|---|---|
| CN | 111183601 A | * | 5/2020 | ........... H04B 17/102 |

OTHER PUBLICATIONS

What is Edge Cloud? [online]. Ciena Corporation, 2018 [retrieved on Sep. 28, 2024]. Retrieved from the internet <URL:https://web.archive.org/web/20181104111237/https://www.ciena.com/insights/what-is/What-is-Edge-Cloud.html> (Year: 2018) (Year: 2018 ).*

*Primary Examiner* — Molly Wilburn
*Assistant Examiner* — Aidan Keup
(74) *Attorney, Agent, or Firm* — Vivacqua Crane, PLLC

(57) ABSTRACT

An automobile vehicle visual wireless-based positioning system, incudes an automobile vehicle having a radio receiver. A map contains candidate locations of access-points (APs) and access-point corresponding media-access-control (MAC) IDs. A wireless range sensor determines different ranges of various detected APs visible to the automobile vehicle. An image collection feature identifies image data visible to the automobile vehicle. A real-time feature matching element matching features identified by image collection feature with data from the map. A filter receives an output from the real-time feature matching element to generate an automobile vehicle pose.

11 Claims, 6 Drawing Sheets

(56) References Cited

U.S. PATENT DOCUMENTS

| | | |
|---|---|---|
| 2016/0198308 A1 | 7/2016 | Marti et al. |
| 2017/0277960 A1 | 9/2017 | Ramasamy |
| 2019/0146500 A1* | 5/2019 | Yalla ................. G01C 21/3407 |
| | | 701/25 |
| 2019/0271549 A1 | 9/2019 | Zhang et al. |
| 2020/0059886 A1 | 2/2020 | Yu et al. |
| 2021/0108926 A1* | 4/2021 | Tran ........................ G06T 17/05 |
| 2021/0333410 A1 | 10/2021 | Gum et al. |
| 2021/0341303 A1 | 11/2021 | Rappel-Kroyzer et al. |
| 2022/0042821 A1 | 2/2022 | Patterson et al. |
| 2022/0345859 A1* | 10/2022 | Falla Cepeda .......... H04W 4/40 |
| 2022/0402485 A1 | 12/2022 | Kobilarov et al. |
| 2023/0118619 A1 | 4/2023 | Horihata |
| 2023/0278574 A1 | 9/2023 | Buda et al. |
| 2024/0036631 A1 | 2/2024 | Ma et al. |
| 2024/0155303 A1 | 5/2024 | Visser et al. |
| 2024/0323908 A1 | 9/2024 | Manolakos et al. |

\* cited by examiner

VISUAL WIRELESS BASED POSITIONING EXPLOITING MULTIPATH FOR OUTDOOR POSITIONING

INTRODUCTION

The present disclosure relates to vehicle positioning systems using wireless technology.

Wireless signals and visual features are used separately for positioning and mapping. Positioning using wireless signals typically requires wireless infrastructure to be accurately mapped prior to use. Global Positioning System (GPS) operation for vehicles including automobile vehicles using wireless signals provides wireless infrastructure but may be negatively impacted by environmental conditions, including buildings, structure, reflective surfaces and the like. A precise location of an automobile vehicle, or pose, is necessary if the vehicle environment contains negative environmental conditions reducing accurate use of wireless signals.

Multipath is also known to degrade performance of a wireless based positioning system. In wireless and radio communication, multipath is a propagation phenomenon that results in signals reaching a receiving antenna by two or more paths. Causes of multipath include atmospheric ducting, ionospheric reflection and refraction, and reflection from water bodies and terrestrial objects such as mountains and buildings. When the same signal is received over more than one path, the multiple signal path receipt may create interference and phase shifting of the received signal and therefore use of the received signal may generate an inaccurate location of an automobile vehicle. Destructive interference causes fading which may cause a wireless signal to become too weak in certain areas to be received adequately.

Thus, while current automobile vehicle positioning systems achieve their intended purpose, there is a need for a new and improved automobile vehicle positioning system.

SUMMARY

According to several aspects, an automobile vehicle visual wireless-based positioning system, incudes an automobile vehicle having a radio receiver. A map contains candidate locations of access-points (APs) and access-point corresponding media-access-control (MAC) IDs and identifying signal reflectors. A wireless range sensor determines different ranges of various detected APs visible to the automobile vehicle. An image collection feature identifies image data visible to the automobile vehicle. A real-time feature matching element matching features identified by image collection feature with data from the map. A filter receives an output from the real-time feature matching element to generate an automobile vehicle pose.

In another aspect of the present disclosure, a MAC association is made for individual ones of the different ranges; and a sensor fusion module fusing positioning input from a GPS receiver, IMU sensors and cloud-calculated positions to produce a precise position final output defining the automobile vehicle pose.

In another aspect of the present disclosure, a LOS-NLOS association is performed on outputs from the MAC association to resolve ambiguity between multiple AP locations to determine which identified AP is a "real" AP.

In another aspect of the present disclosure, a data collection feature, a data collected by the data collection feature including operating and location data from at least one of a vehicle inertial measurement unit (IMU), a vehicle wheel speed sensor (WSS), and a global positioning system (GPS) device.

In another aspect of the present disclosure, an image feature extraction function receives the image data to judge if a database content can be trusted for credible and reliable information.

In another aspect of the present disclosure, the image collection feature includes at least one of a camera and a LIDAR component located in the automobile vehicle.

In another aspect of the present disclosure, the map includes locations of signal reflectors defining surfaces upon which wireless signals may reflect from; and semantic data identifying roadways, buildings and intersections.

In another aspect of the present disclosure, the radio receiver provides range measurements to different APs as line-of-sight (LOS) or non-line-of-sight (NLOS) measurements.

In another aspect of the present disclosure, the map further includes image features developed from systems including for example Scale-Invariant-Feature-Transform (SIFT), Speeded Up Robust Features (SURF) and their coordinates.

In another aspect of the present disclosure, the signal reflectors include at least one of a first surface defining a surface of a sign, a second surface defining a wall of a building, and third surface defining a visual feature.

According to several aspects, an automobile vehicle visual wireless-based positioning system includes an automobile vehicle having a radio receiver and a transmitter. A map contains candidate locations of access-points (APs), the map also contains identifying signal reflectors. A vehicle on-board positioning system of the automobile vehicle collects wireless positioning measurements from detected ones of the APs. The transmitter operates to transmit the wireless positioning measurements to a Cloud-Edge in real-time. A sensor fusion module fuses positioning input from sources including a GPS receiver, IMU sensors, and cloud-calculated positions returned from the Cloud-Edge to produce a precise position final output defining an automobile vehicle pose.

In another aspect of the present disclosure, MAC addresses are associated with the detected ones of the APs and the detected ones of the APs are associated with the candidate locations of the access-points APs.

In another aspect of the present disclosure, non-line-of-sight (NLOS) and line-of-sight (LOS) measurements are associated using a predicted automobile vehicle pose and locations of the signal reflectors from the map.

In another aspect of the present disclosure, if a signal reflector falls between the predicted automobile vehicle pose and a mapped AP location, a longer-range measurement is associated with that mapped AP location such that the longer-range measurement of the mapped AP defines a reflection.

In another aspect of the present disclosure, if the signal reflector does not fall between the predicted automobile vehicle pose and a mapped AP location, a shorter of the range measurements is associated with the mapped AP and the mapped AP defines a LOS feature.

In another aspect of the present disclosure, an On-Cloud positioning group includes a Bayesian filter which retrieves data from a sample point cloud, a group of global virtual APs and a group of planar surface models.

In another aspect of the present disclosure, a single measurement of wireless positioning signal data passed to the Bayesian filter, wherein an output of the Bayesian filter defines an initial position estimate of the automobile vehicle.

According to several aspects, a method for determining an automobile vehicle position of an automobile vehicle having a radio receiver includes: identifying candidate locations of access-points (APs) and access-point corresponding media-access-control (MAC) IDs on a map; also downloading identities of signal reflectors from the map; determining different ranges of various detected ones of the APs visible to the automobile vehicle using a wireless range sensor; retrieving image data visible to the automobile vehicle using an image collection feature; matching features identified by the image collection feature with data from the map; and sending an output from a real-time feature matching element to a filter to generate an automobile vehicle pose.

In another aspect of the present disclosure, the method further includes: conducting a start operation upon a key-on operation of the automobile vehicle; sampling particles from a previous operation of the automobile vehicle to establish an initial map reference; loading planar reflectors previously identified during sampling from the map reference; and acquiring path lengths and powers of the access-points (APs) from the map reference.

In another aspect of the present disclosure, the method further includes: inputting LOS and NLOS AP positions onto the map reference; associating the AP path lengths and powers based on MAC IDs of the APs; and updating particle weights of the APs selecting from multiple particle weights having a highest likelihood of being non-reflectors.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
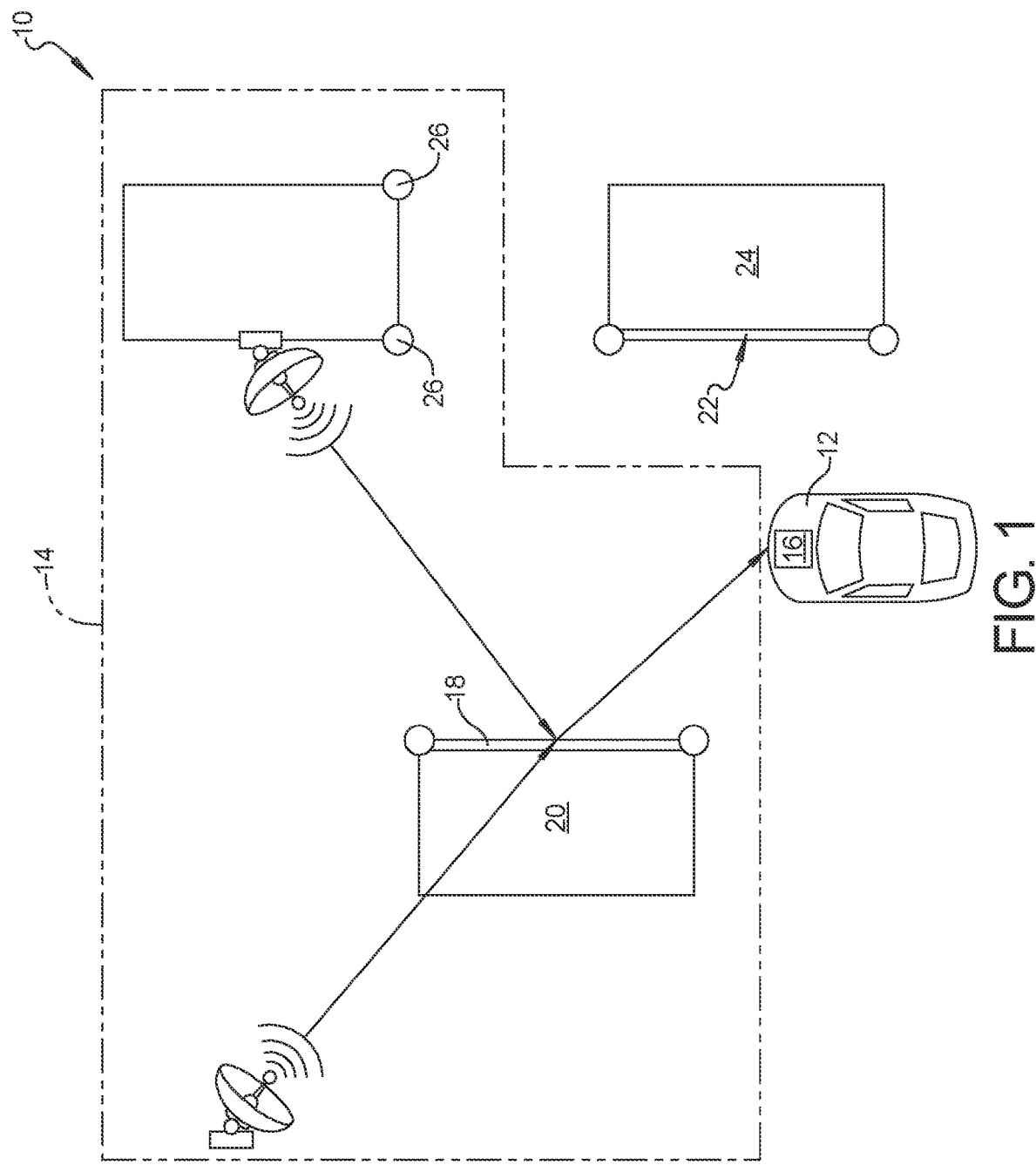
FIG. 1 is a diagrammatic presentation of a visual wireless-based positioning system according to an exemplary aspect.

Referring to FIG. 1, according to several aspects a visual wireless-based positioning system 10 is used to determine a position or pose of an automobile vehicle 12 on a map 14.

The automobile vehicle 12 is equipped with a radio receiver 16 such as but not limited to WiFi functional tone management (FTM), 5G, and the like. An environment which the automobile vehicle 12 operates in may hinder a global positioning system (GPS) performance. The map 14 contains candidate locations of access-points (APs) and their corresponding media-access-control (MAC) IDs. Locations of potential signal reflectors defining surfaces upon which wireless signals may reflect from such as a first surface 18 defining a surface of a sign 20, a second surface 22 such as a wall of a building 24, an object 26 such as a tree, and the like are identified. The map 14 may further contain image features developed from systems such as Scale-Invariant-Feature-Transform (SIFT) and their coordinates. The map 14 further contains other relevant semantic data identifying for example roadways, signs, intersections and the like. The radio receiver 16 may also provide range measurements to different APs, however multiple ranges may be reported due to the above noted signal reflectors and measurements may be provided as line-of-sight (LOS) or non-line-of-sight (NLOS) measurements.

Referring to FIG. 2 and again to FIG. 1, a flow diagram 28 provides process steps for operation of the visual wireless-based positioning system 10. In a first process 30, different ranges of various detected APs visible to the automobile vehicle 12 are determined using a wireless range sensor 32 including an AoA sensor 32. In a second or MAC association process 34, a MAC association is made for individual ones of the different ranges. In a third process 36 a LOS-NLOS association 38 is then performed on the outputs from the MAC association process 34. The LOS-NLOS association 38 resolves ambiguity between multiple AP locations to determine which identified AP is a "real" AP, the real AP defining an AP that does not include data from a reflection or data returned from a reflector. An example ambiguity may include a reflector positioned between a determined automobile vehicle position and a map-identified AP. Such a reflector may be disregarded as a reflection and not a real or true vehicle AP. An output from the LOS-NLOS association 38 is input to a filter 40.

In parallel with the first process 30, the map 14 is accessed to identify AP locations and IDs for the items output from the first process 30 to be used in the MAC association process 34. The map 14 is also accessed to identify one or more reflectors which are input into the LOS-NLOS association 38.

Also in parallel with the first process 30, an image detection process 42 identifies image data from an image collection feature including a camera 44, a laser imaging detection and ranging (LIDAR) component 46 or the like of the automobile vehicle 12. This image data is forwarded for an image feature extraction process 48, which may use for example a Scale-Invariant-Feature-Transform (SIFT) system algorithm 50 used to extract visual features from an image. The output from the image feature extraction process 48 is forwarded for a feature matching process 52 which matches features identified by the camera 44, the LIDAR component 46 or the like with data from the map 14 in real-time. Output from the feature matching process 52 is forwarded to the filter 40.

Further vehicle data to assist is identifying a pose of the automobile vehicle 12 is collected in a data collection feature or process 54. This data includes operating and location data such from a vehicle inertial measurement unit (IMU) 56, a vehicle wheel speed sensor (WSS) 58, or a global positioning system (GPS) device 60. The data is directly forwarded to the filter 40. An output from the filter

40 defines an automobile vehicle pose 62. The vehicle pose 62 may also be returned to the third process 36 and the LOS-NLOS association process 38 for further iteration.

Detected wireless APs are associated with mapped APs using MAC addresses. NLOS/LOS measurements are associated using the vehicle pose 62 of the automobile vehicle 12 and the locations of the reflective surfaces from the map 14 described in reference to FIG. 1. If a reflector falls between a predicted automobile vehicle pose and a mapped AP location, then a longer-range measurement is associated with that mapped AP such that the longer-range measurement of the mapped AP defines a reflection. If a reflector does not fall between the predicted automobile vehicle pose and a mapped AP location, the shorter of the two range measurements is associated with the mapped AP and the mapped AP defines a LOS feature.

Figure 2:
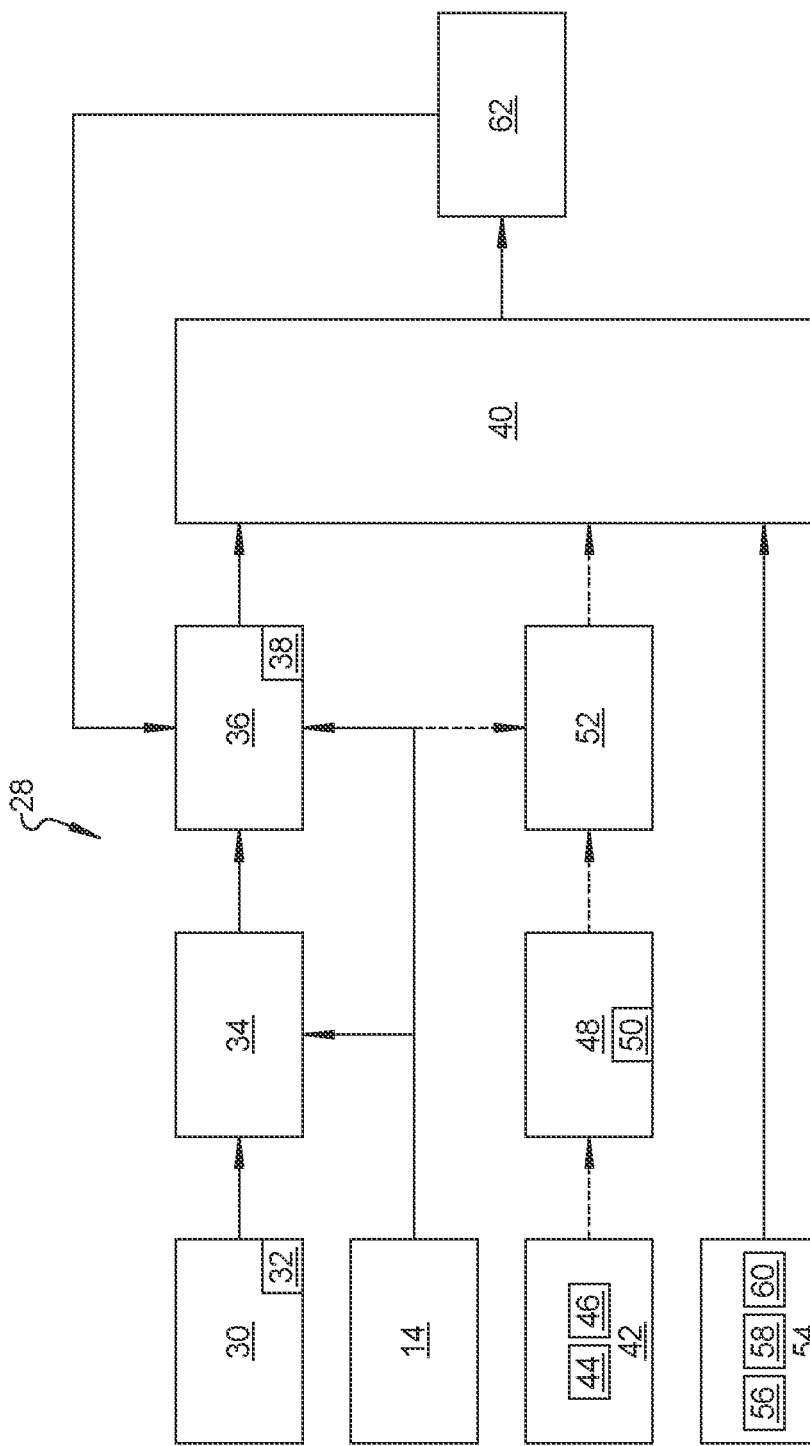
FIG. 2 is a flow diagram presenting process steps for determining a pose of an automobile vehicle of the system of FIG. 1.

Referring to FIG. 3 and again to FIGS. 1 and 2, a vehicle on-board positioning system 64 of the automobile vehicle 12 collects wireless positioning measurements 66 with nearby WiFi APs and using a transmitter transmits the measurements to a Cloud/Edge 68 in real-time. The vehicle on-board positioning system 64 then uses a sensor fusion module 70 to fuse positioning input from multiple sources, including a GPS receiver 72, inertial-measurement-unit (IMU) sensors 74, cloud-calculated positions 76, and the like to produce a precise position final output defining the pose 62.

The vehicle on-board positioning system 64 is assisted using an On-Cloud Positioning group 80. The wireless positioning measurements 66 are grouped for transfer as a measurement group 78 for transfer to the Cloud/Edge 68 in real-time. The On-Cloud Positioning group 80 includes a Bayesian Filter 82 which retrieves data from a sample point cloud 84, a group of global virtual APs 86 and a group of planar surface models 88. A single measurement of wireless positioning signal data 90 is also passed to the Bayesian Filter 82. An output of the Bayesian Filter 82 defines an initial position estimate 92 of the automobile vehicle 12. Following multiple iterations of the wireless positioning signal via the On-Cloud Positioning group 80 a precise location 94 of the automobile vehicle 12 is returned from the On-Cloud Positioning group 80 to the vehicle on-board positioning system 64 to assist in determination of the pose 62.

Figure 3:
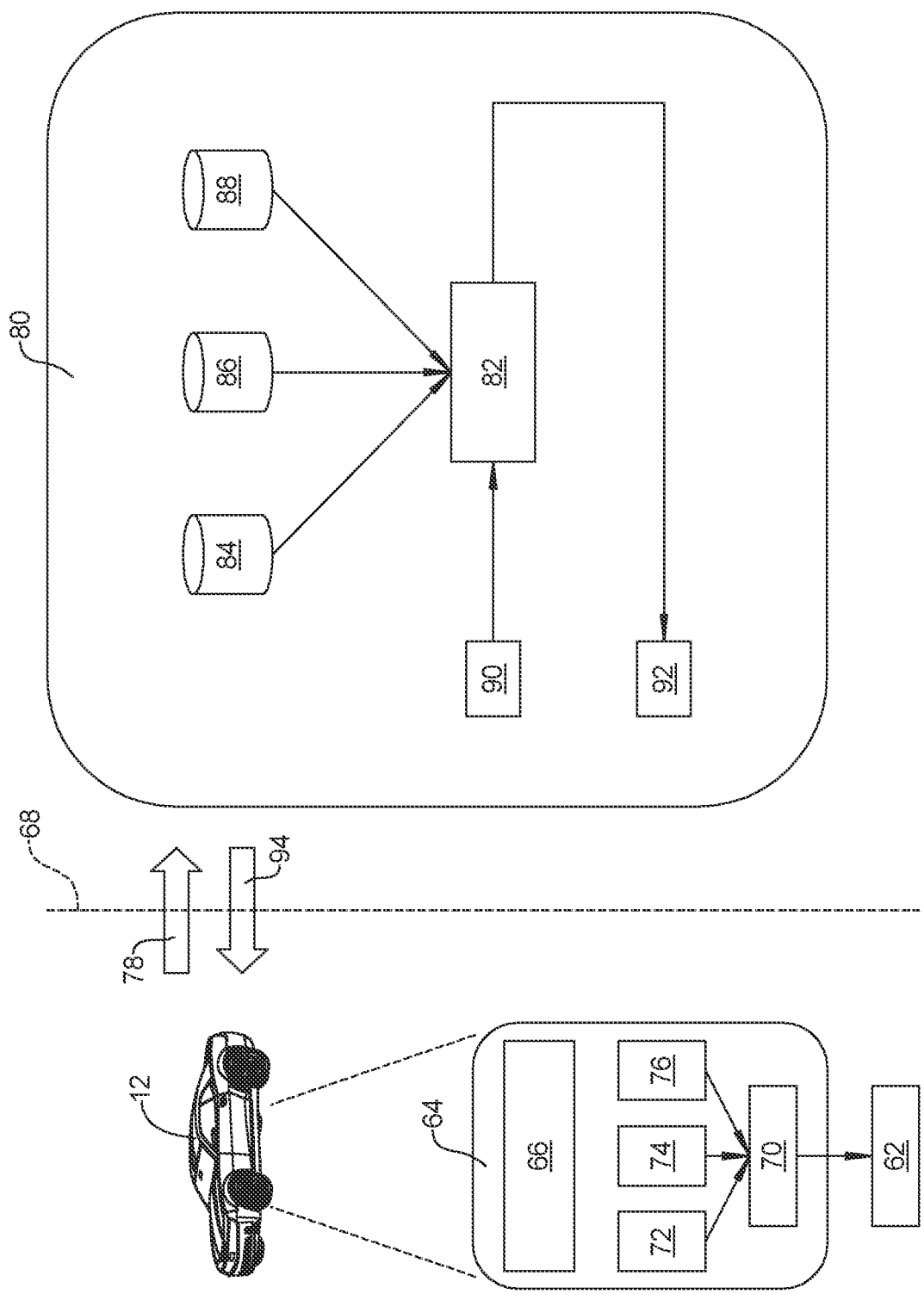
FIG. 3 is a diagram presenting steps to perform a real-time positioning process using On-Cloud data for the system of FIG. 1.

Referring to FIG. 4 and again to FIGS. 1 through 3, real-time vehicle positioning may also be performed using an On-Cloud Positioning group 96 modified from the On-Cloud Positioning group 80 described in reference to FIG. 4. The Bayesian Filter 82 is moved out of the On-Cloud Positioning group 96 and positioned in a vehicle on-board positioning system 98 together with downloading modules including a sample point cloud 84a, a group of global virtual APs 86a and a group of planar surface models 88a. The vehicle on-board positioning system 98 having the Bayesian Filter 82 therewith otherwise functions similar to the vehicle on-board positioning system 64.

Figure 4:
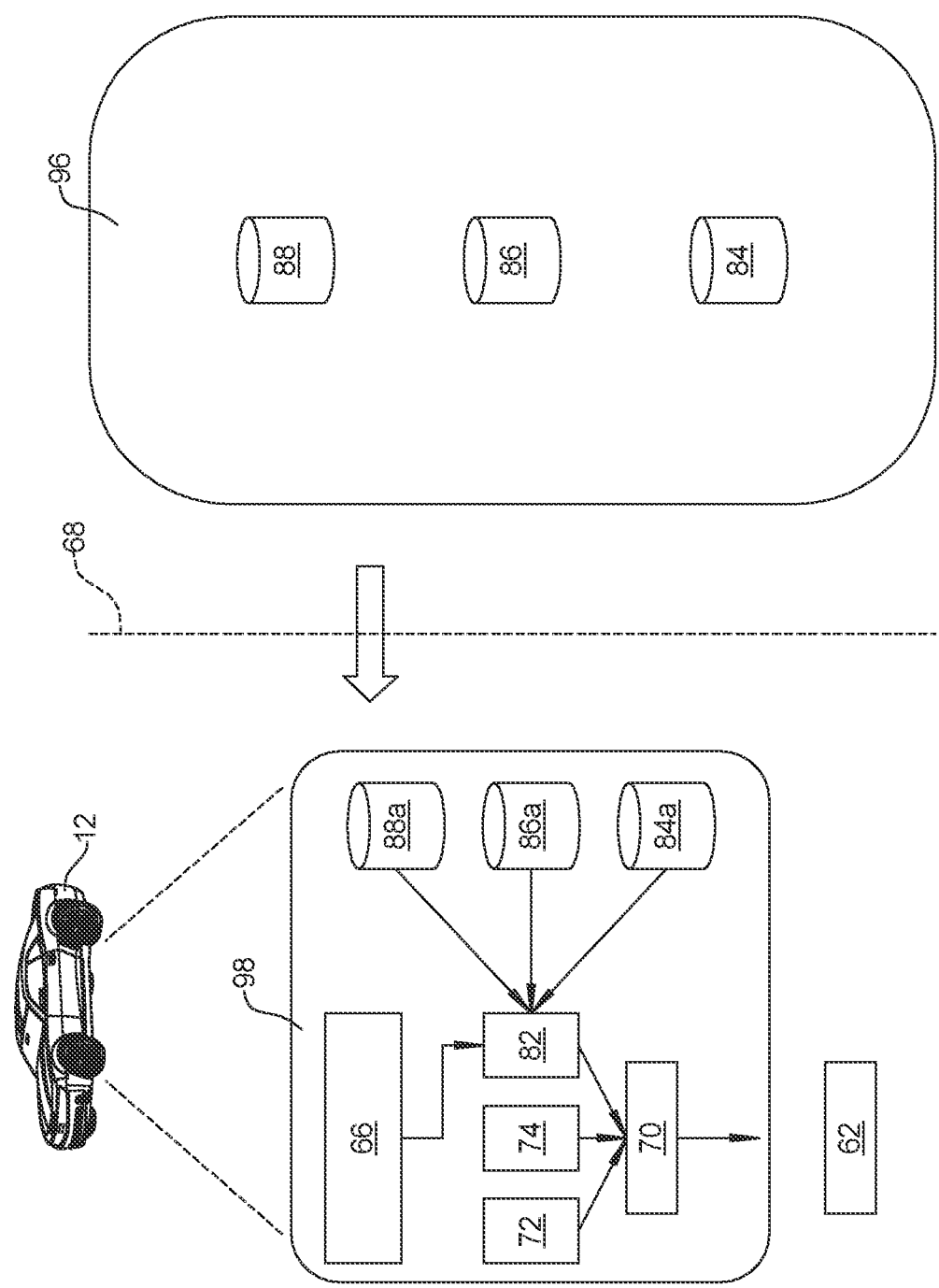
FIG. 4 is a diagram modified from FIG. 3 to present a real-time positioning process having On-Cloud data and filtering positioned in the automobile vehicle.

Referring to FIG. 5 and again to FIGS. 1 through 4, on the Cloud side, such as in the On-Cloud Positioning group 80, the real-time positioning process receives wireless positioning measurements from the automobile vehicle 12, shown in FIGS. 1, 3, and 4, and leverages a particle filter such as the Bayesian Filter 82 to estimate the position of the automobile vehicle 12 (not shown in this view). As further shown in FIG. 5, a roadway 100 is presented having multiple reflectors positioned along the roadway 100, including a first reflective surface 102, a first building 104 having a second reflective surface 106, a third reflective surface 108 and a fourth reflective surface such as defining a stop sign. In a direction of travel 112 of the vehicle a first set of hollow dots 114 represent particles from the particle filter such as the Bayesian Filter 82, and a second set of solid dots 116 represent samples from a sample position database 118. A weight of a particle, uj, can be calculated as shown in Equation 1 as follows:

$$w_j = \frac{1}{\sum_i d(s_i, u_j) \cdot \text{PDP\_diff}(s_i, u_j)} \quad \text{Equation 1}$$

For Equation 1, the function d( ) is a function which returns the distance between si and uj; the function parallel-distributed-processing (PDP) PDP_diff( ) returns the difference between si and uj.

Figure 5:
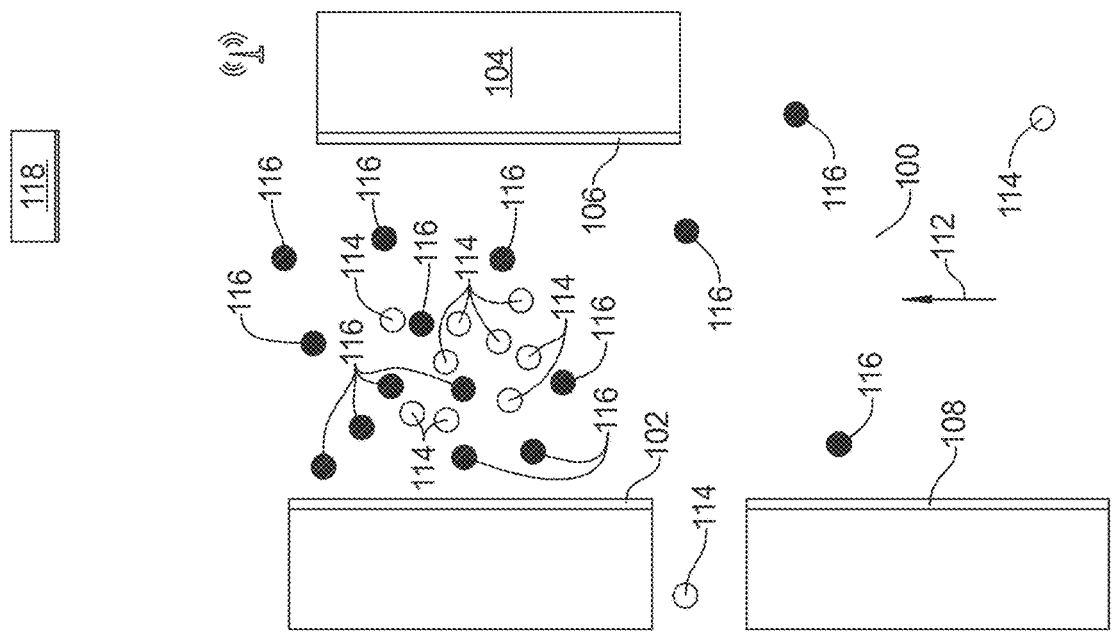
FIG. 5 is a diagram presenting output particles from a particle filter identifying returned reflective surfaces on the system of FIG. 1.

Referring to FIG. 6 and again to FIG. 5, a graph 120 presents a power 122 in dBm against a delay time 124 in microseconds. A first curve 126 represents the si's PDP distribution for Equation 1, and a second curve 128 represents the PDP collected from the automobile vehicle 12 in real-time. The function PDP_diff( ) of Equation 1 returns the accumulated difference between the first curve 126 and the second curve 128.

Figure 6:
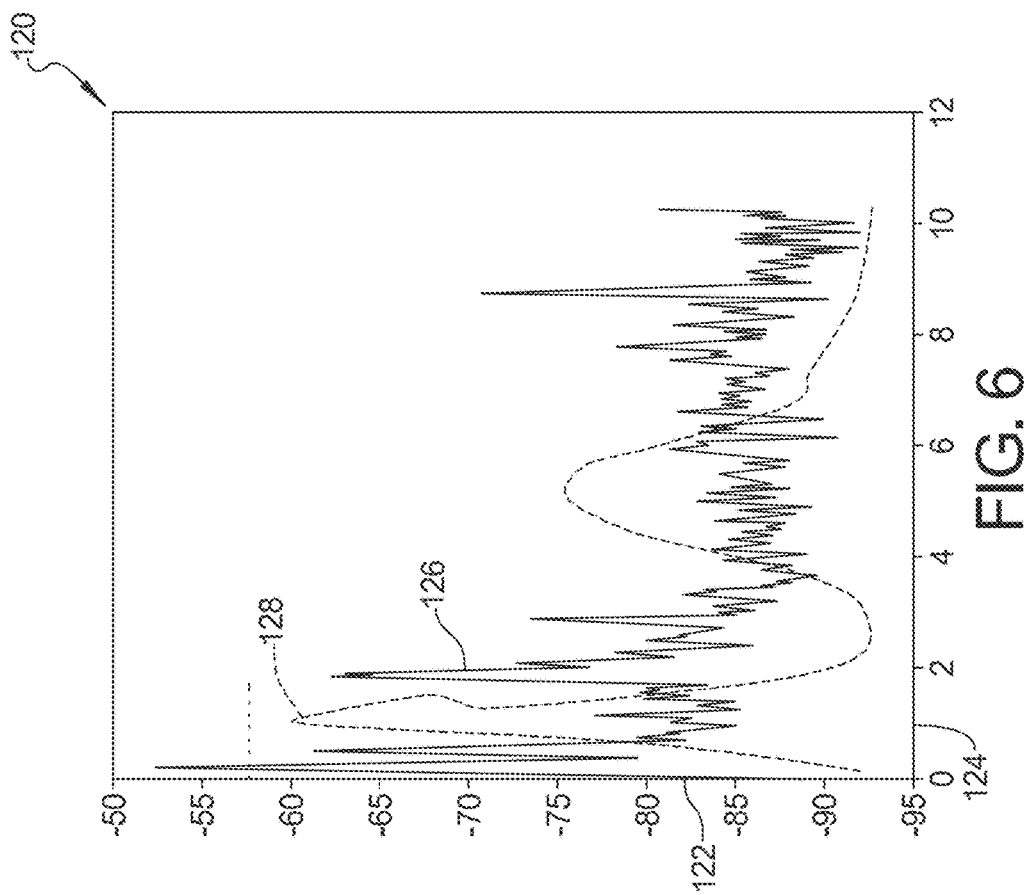
FIG. 6 is a graph presenting weighting effects of the particles presented in FIG. 5.

With continuing reference to FIGS. 5 and 6, if a particle, uj, is very close to a sample, si, and uj and si have very similar power delay profiles, then si contributes a higher weight to uj.

Figure 7:
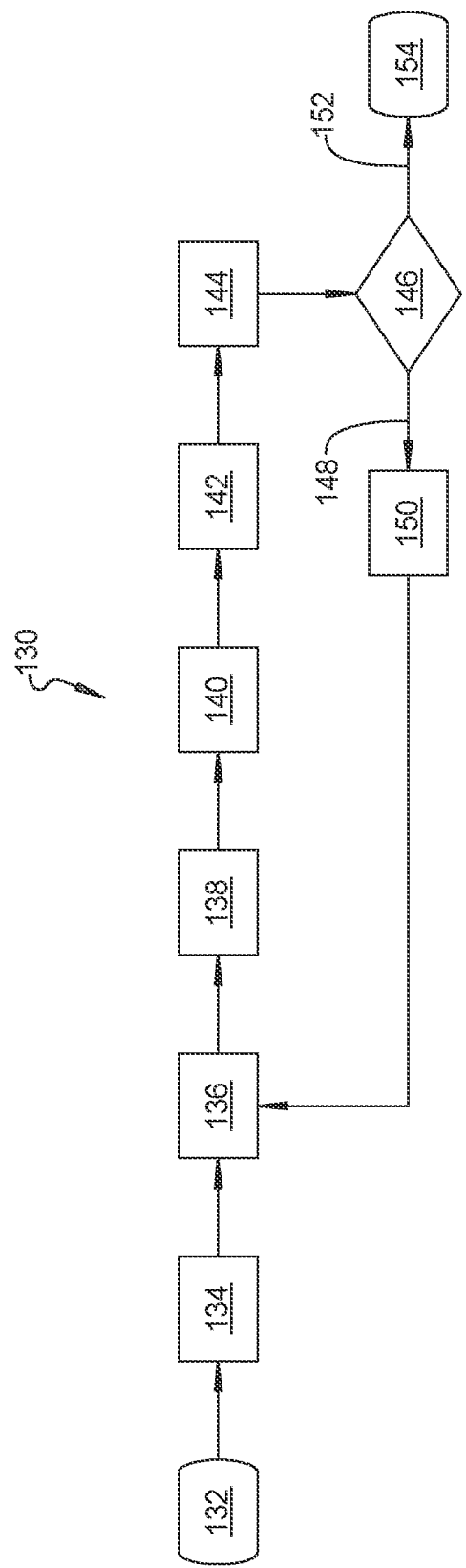
FIG. 7 is a flow diagram presenting process steps to determine a vehicle position.

Referring to FIG. 7 and again to FIGS. 1 through 6, a process flow diagram 130 presents operational steps for a follow-on operation of the visual wireless-based positioning system 10. A start operation 132 is conducted for example upon a key-on operation of the automobile vehicle 12 described in reference to FIG. 1. In a sampling operation 134, particles from a previous operation of the system are sampled to establish an initial map reference. In a first loading operation 136, planar reflectors previously identified in the sampling operation 134 are loaded from the map. In an acquisition operation 138, path lengths and powers of the identified APs are acquired. In a second loading operation 140, LOS and NLOS AP positions are loaded. In an association operation 142, the AP measurements loaded in the previous acquisition operation 138 are associated with the map information based on the MAC IDs. In an update operation 144, particle weights are updated using the particle weights with a highest likelihood of being non-reflectors. In a query operation 146 a query is conducted if the particle assessments from the update operation 144 is complete. If a response 148 from the query operation 146 is NO, the program continues to a resample operation 150 wherein the particles are resampled and propagated. Following the resample operation 150 the program returns to the first loading operation 136. If a response 152 from the query operation 146 is YES, the program ends at an end operation 154.

According to a first aspect, an autonomous-driving-system (ADS) includes a cloud-based or local map that provides relevant features which can be matching in real time to determine the pose of the automobile vehicle 12 in a global-navigation-satellite-system (GNSS) denied environment.

According to a second aspect, using a vehicle-to-vehicle (V2V) system a precise pose of the automobile vehicle 12 provided in a GNSS denied environment provides a level of accuracy required for V2V applications.

According to a third aspect, for a traffic aware system the precise pose 62 may be used to learn the traffic conditions of specific roads in a GPS denied environment. This data may be shared with a cloud-based interface and used to determine new automobile vehicle routes to avoid congested areas.

A visual wireless-based positioning system of the present disclosure offers several advantages. These include a system wherein an algorithm provides for localization in an outdoor environment using a combination of visual features and wireless signals. Multipath effects are accounted for by identifying and modeling sources of reflections using maps such as the map 14. A precise localization or pose 62 is modeled using range measurements while accounting for the multipath effects and the reflections. Visual features are exploited to identify reflections and dynamic objects in the environment during mapping. Visual features are used to aid in creation of a consistent map along with wireless measurements. A set of positioning algorithms leverage the planar models in the joint visual/wireless maps to estimate the multipath effect and improve positioning accuracy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle visual wireless-based positioning system, comprising:
    an automobile vehicle having a radio receiver and a transmitter;
    a map containing candidate locations of access-points (APs) and access-point corresponding media-access-control (MAC) IDs, the map also identifying signal reflectors;
    a vehicle on-board positioning system of the automobile vehicle collecting wireless positioning measurements from detected ones of the multiple Aps, the transmitter operating to transmit the wireless positioning measurements to a Cloud-Edge in real-time;
    a wireless range sensor determining different multiple ranges of various detected APs visible to the automobile vehicle, wherein the multiple ranges for each of the various detected AP's includes a long-range measurement and a short-range measurement, and wherein the short-range measurement is shorter than the long-range measurement;
    a MAC association process for associating a MAC ID with individual ones of the various detected APs at the different ranges;
    a Line-of-Sight-No-Line-of-Sight (LOS-NLOS) association process performed on outputs from the MAC association process to resolve ambiguity between multiple AP locations to determine which identified AP is a real AP, the real AP defining an AP that does not include data from a reflection or data returned from one of the signal reflectors, wherein when one of the signal reflectors is disposed between a predicted automobile vehicle pose and a mapped AP location, then the long-range measurement is associated with that mapped AP such that the long-range measurement of the mapped AP defines a reflection, and when one of the signal reflectors does not fall between the predicted automobile vehicle pose and a mapped AP location, the short range measurements is associated with the mapped AP and the mapped AP defines a LOS feature;
    an image collection feature identifying image data visible to the automobile vehicle;
    an image feature extraction process receiving the image data to extract visual features from the image data;
    a real-time feature matching process for matching the visual features with data from the map;
    a data collection process, wherein vehicle data collected by the data collection process includes operating and location data from a vehicle inertial measurement unit (IMU). a vehicle wheel speed sensor (WSS), and a global positioning system (GPS) device; and
    a filter receiving an output from the LOS-NLOS association process, an output from the real-time feature matching process element, and the vehicle data from the data collection process to generate an automobile vehicle pose.

2. The automobile vehicle visual wireless-based positioning system of claim 1, further including a sensor fusion module to fuse the automobile vehicle pose output from the filter with cloud-calculated positions, the sensor fusion module producing a final automobile vehicle pose.

3. The automobile vehicle visual wireless-based positioning system of claim 2, wherein the cloud-calculated positions are determined by grouping wireless positioning measurements for transfer as a measurement group to the Cloud-Edge in real-time and a Bayesian Filter retrieves data from a sample point cloud, a group of global virtual APs and a group of planar surface models, and a single measurement of wireless positioning signal data is also passed to the Bayesian Filter, wherein an output of the Bayesian Filter defines an initial position estimate of the automobile vehicle, and following multiple iterations of the wireless positioning signal a location of the automobile vehicle is returned as the cloud-calculated position.

4. The automobile vehicle visual wireless-based positioning system of claim 1, wherein the image collection feature defines at least one of a camera and a LIDAR component located in the automobile vehicle.

5. The automobile vehicle visual wireless-based positioning system of claim 1, wherein the map includes locations of signal reflectors defining surfaces upon which wireless signals may reflect from; and semantic data identifying roadways and intersections.

6. The automobile vehicle visual wireless-based positioning system of claim 1, wherein the radio receiver provides range measurements to different APs as line-of-sight (LOS) or non-line-of-sight (NLOS) measurements.

7. The automobile vehicle visual wireless-based positioning system of claim 1, wherein the map further includes image features developed from systems including Scale-Invariant-Feature-Transform (SIFT), Speeded Up Robust Features (SURF), and their coordinates.

8. The automobile vehicle visual wireless-based positioning system of claim 1, wherein the signal reflectors include at least one of a first surface defining a surface of a sign, a second surface defining a wall of a building, and third surface defining a visual feature.

9. A method for determining an automobile vehicle position of an automobile vehicle having a radio receiver, comprising:
    identifying candidate locations of multiple access-points (APs) and access-point corresponding media-access-control (MAC) IDs on a map;
    downloading identities of signal reflectors from the map;
    determining multiple ranges of various detected ones of the multiple APs visible to the automobile vehicle using a wireless range sensor, wherein the multiple ranges for each of the various detected AP's includes a long-range measurement and a short-range measurement, and wherein the short-range measurement is shorter than the long-range measurement;
collecting wireless positioning measurements from detected ones of the multiple APs;
transmitting the wireless positioning measurements to a Cloud-Edge in real-time;
associating, using a MAC association process, a MAC ID with individual ones of the various detected APs at the different ranges;
associating, using a Line-of-Sight No-Line-of-Sight (LOS-NLOS) association process, LOS and NLOS on outputs from the MAC association process to resolve ambiguity between multiple AP locations to determine which identified AP is a real AP, the real AP defining an AP that does not include data from a reflection or data returned from one of the signal reflectors, wherein when one of the signal reflectors is disposed between a predicted automobile vehicle pose and a mapped AP location, then a long-range measurement is associated with that mapped AP such that the long-range measurement of the mapped AP defines a reflection, and when one of the signal reflectors does not fall between the predicted automobile vehicle pose and a mapped AP location, the short range measurements is associated with the mapped AP and the mapped AP defines a LOS feature;
retrieving image data visible to the automobile vehicle using an image collection feature;
extracting, using an image feature extraction process, visual features from the image data;
matching, using a real-time feature matching process, the visual features with data from the map;
collecting, using a data collection process, vehicle data that includes operating and location data from a vehicle inertial measurement unit (IMU), a vehicle wheel speed sensor (WSS), and a global positioning system (GPS) device;
sending to a filter an output from the LOS-NLOS association process, an output from the real-time feature matching process, and the vehicle data from the data collection process; and
generating, using the filter, an automobile vehicle pose.

10. The method of claim 9, further including:
conducting a start operation upon a key-on operation of the automobile vehicle;
sampling particles from a previous operation of the automobile vehicle to establish an initial map reference;
loading planar reflectors previously identified during sampling from the map reference; and
acquiring AP path lengths and powers of the multiple APs from the map reference.

11. The method of claim 10, further including:
inputting LOS and NLOS AP positions onto the map reference;
associating the AP path lengths and powers based on MAC IDs of the APs; and
updating particle weights of the multiple APs selecting from multiple particle weights having a highest likelihood of being non-reflectors.

* * * * *